(12) United States Patent
Wiseman

(10) Patent No.: US 11,554,942 B1
(45) Date of Patent: Jan. 17, 2023

(54) VEHICLE LIFTING JACK

(71) Applicant: Allen L. Wiseman, Tarpon Springs, FL (US)

(72) Inventor: Allen L. Wiseman, Tarpon Springs, FL (US)

( * ) Notice: Subject to any disclaimer, the term of this patent is extended or adjusted under 35 U.S.C. 154(b) by 586 days.

(21) Appl. No.: 16/661,030

(22) Filed: Oct. 23, 2019

(51) Int. Cl.
| | |
|---|---|
| *B66F 3/00* | (2006.01) |
| *B66D 1/28* | (2006.01) |
| *B60D 1/06* | (2006.01) |
| *B60D 1/52* | (2006.01) |
| *B60S 5/00* | (2006.01) |

(52) U.S. Cl.
CPC .............. *B66F 3/00* (2013.01); *B60D 1/06* (2013.01); *B60D 1/52* (2013.01); *B66D 1/28* (2013.01); *B60S 5/00* (2013.01)

(58) Field of Classification Search
CPC .................................. B66F 3/00; B60D 1/52
USPC ...................... 254/4 R, 133 R, 264, 266, 389
See application file for complete search history.

(56) References Cited

U.S. PATENT DOCUMENTS

| | | | | |
|---|---|---|---|---|
| 3,734,466 A | * | 5/1973 | Mason ....................... | B66F 7/22 254/89 R |
| 5,697,597 A | * | 12/1997 | Goodbold ................ | B66D 3/02 254/4 B |
| 5,806,837 A | * | 9/1998 | Cargill ..................... | B66D 1/04 254/133 R |
| 7,648,123 B2 | * | 1/2010 | Gagnon ................... | B66D 3/12 254/133 R |

OTHER PUBLICATIONS

"Trunnion Shaft | Volvo-White | T-Ride Suspensions." TruckSpring, www.truckspring.com/products/Trunnion-Shaft-Volvo-White-T-Ride-Suspensions_VT13.aspx. Accessed Jul. 5, 2022. (Year: 2022).*

* cited by examiner

*Primary Examiner* — Lee D Wilson
*Assistant Examiner* — Jonathan G Santiago Martinez
(74) *Attorney, Agent, or Firm* — Gulf Coast Intellectual Property Group

(57) ABSTRACT

A vehicle jack configured to provide lifting of either the front end or the rear end of the vehicle wherein the vehicle jack is operably coupled to a winch secured to the vehicle. The vehicle jack includes a frame having a vertical support member wherein the vertical support member further includes a base member secured to the first end thereof. The vehicle jack includes a vehicle attachment assembly that is slidably coupled to the vertical support member and is provided in a first embodiment operable to secure to the rear end of a vehicle and a second embodiment that is configured to be secured to the front end of the vehicle. The first embodiment of the vehicle attachment assembly is configured to operably couple with a frame hitch. The second embodiment of the vehicle attachment assembly operably couples to the front bumper.

7 Claims, 4 Drawing Sheets

VEHICLE LIFTING JACK

FIELD OF THE INVENTION

The present invention relates generally to vehicle accessories, more specifically but not by way of limitation, a vehicle jack that is configured to assist in lifting either end of a vehicle wherein the present invention is further configured to be operably coupled to a winch that is mounted to the vehicle.

BACKGROUND

Millions of individuals drive large four-wheel drive vehicles such as but not limited to larger trucks and four wheel drive Jeeps. These vehicles are configured for either recreational purposes or for other specific tasks. Many of these types of vehicles are often equipped with larger tires and wheels and can additionally have suspension modification that positions the frame of the vehicle higher off the ground. The aforementioned types of vehicles will typically weigh thousands of pounds more than a conventional automobile operated by the average individual.

One problem with the larger four-wheel drive vehicles is the tire changing process or lifting the vehicle as needed for certain other maintenance activities. Conventional automobile jacks do not have the lift range to provide the necessary lift in order to perform activities such as but not limited to changing a tire. Manual high-lift bumper jacks that are configured to secure to the bumper of these vehicles are available and can be utilized to provide the necessary lift to execute the desired tasks. One issue with the aforementioned is the weight of the vehicles. As these larger vehicles weigh more than the average automobile, utilizing a manual jack can present physical challenges. Many of the larger four-wheel drive vehicles are configured with winches that are typically integrally mounted with the front bumper of the vehicle. The winches are powered by the electrical system of the vehicle and utilize a cable wherein the winch/cable assembly can be used for various tasks such as but not limited to releasing a vehicle that is stuck.

Accordingly, there is a need for a vehicle jack that can be operably coupled to either the front end or rear end of a vehicle that has a winch secured thereto wherein the vehicle jack is configured to operably couple to the winch so as to utilize the winch to provide lifting of the vehicle.

SUMMARY OF THE INVENTION

It is the object of the present invention to provide a vehicle jack that is configured to operably couple to either the front end or rear end of a vehicle and a winch mounted to the vehicle wherein the present invention includes a frame having a vertical support member.

Another object of the present invention is to provide a vehicle jack operably coupled to a winch on a vehicle wherein the vehicle jack utilizes the winch to provide lifting of the vehicle wherein the vehicle jack of the present invention includes a base support member secured to one end of the vertical support member.

A further object of the present invention is to provide a vehicle jack that is configured to operably couple to either the front end or rear end of a vehicle and a winch mounted to the vehicle wherein the present invention further includes a first embodiment and a second embodiment of a vehicle attachment assembly.

Still another object of the present invention is to provide a vehicle jack operably coupled to a winch on a vehicle wherein the vehicle jack utilizes the winch to provide lifting of the vehicle wherein the vehicle jack of the present invention wherein the vehicle attachment assembly is configured to slidably traverse along the vertical support member.

An additional object of the present invention is to provide a vehicle jack that is configured to operably couple to either the front end or rear end of a vehicle and a winch mounted to the vehicle wherein the first embodiment of the vehicle attachment assembly is configured to operably couple with a towing hitch receiver.

Yet a further object of the present invention is to provide a vehicle jack operably coupled to a winch on a vehicle wherein the vehicle jack utilizes the winch to provide lifting of the vehicle wherein the second embodiment of the vehicle attachment assembly is configured to operably couple to the bumper of the vehicle.

Another object of the present invention is to provide a vehicle jack that is configured to operably couple to either the front end or rear end of a vehicle and a winch mounted to the vehicle wherein each of the embodiments of the vehicle attachment assembly includes a hook/cable interface for securing to the cable of the winch on the vehicle.

An alternative object of the present invention is to provide a vehicle jack operably coupled to a winch on a vehicle wherein the vehicle jack utilizes the winch to provide lifting of the vehicle wherein the second embodiment of the vehicle attachment assembly further includes a winch cable interface.

Yet a further object of the present invention is to provide a vehicle jack that is configured to operably couple to either the front end or rear end of a vehicle and a winch mounted to the vehicle wherein the present invention further includes a plurality of pulleys secured to the frame of the present invention.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
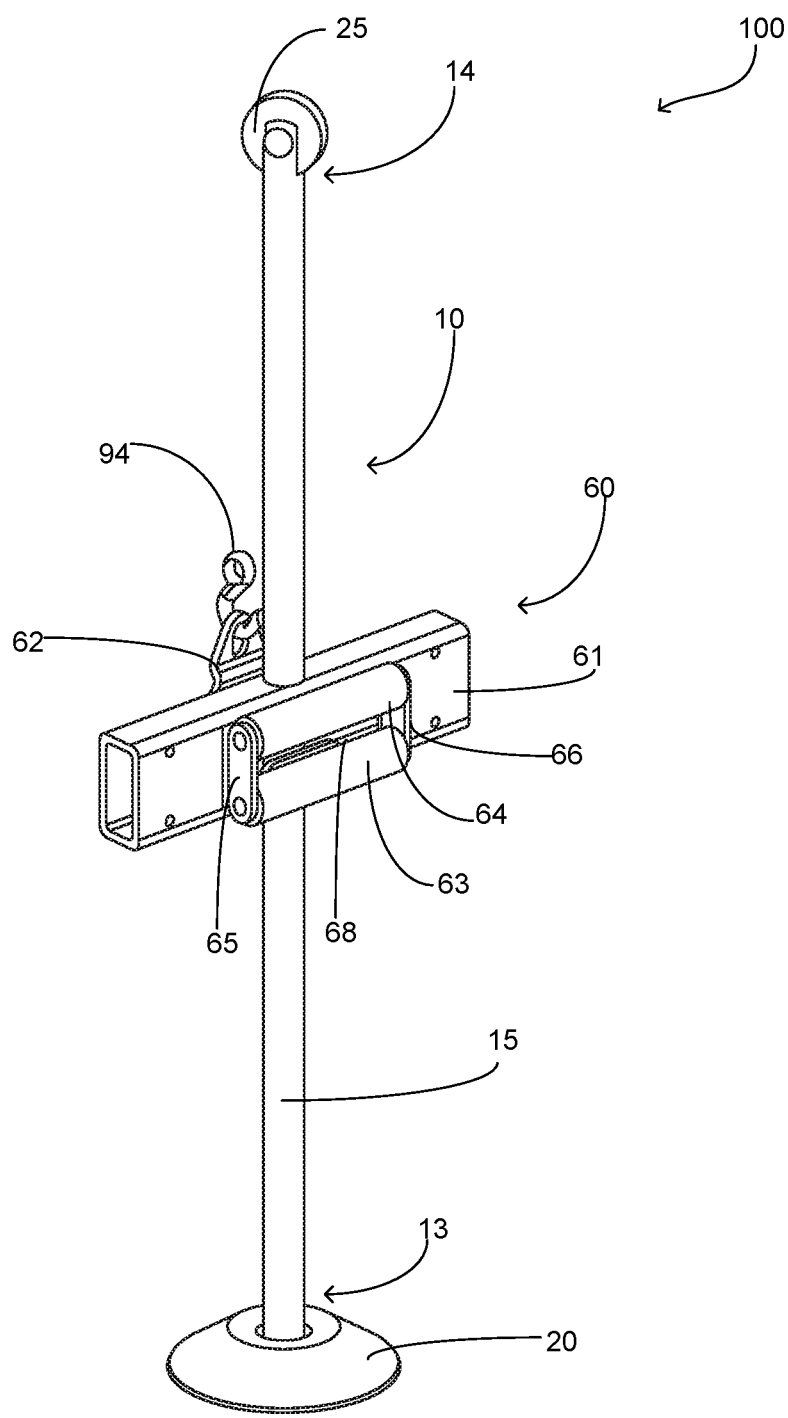
FIG. 1 is a perspective view of the present invention with the second embodiment of the vehicle attachment assembly.
Figure 2:
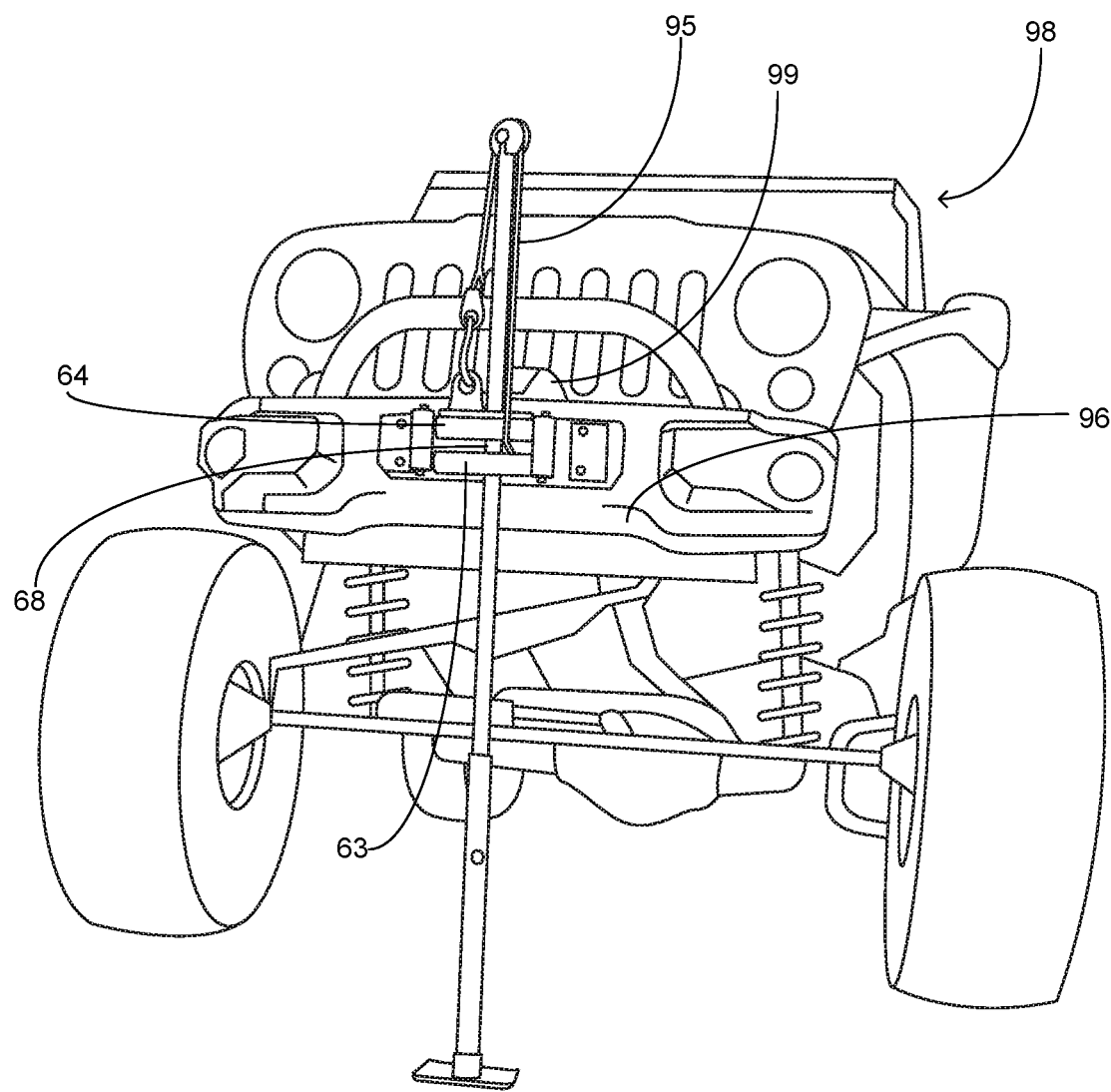
FIG. 2 is a perspective view of the present invention with the second embodiment of the vehicle attachment assembly operably coupled to an exemplary vehicle.

Referring now to the drawings submitted herewith, wherein various elements depicted therein are not necessarily drawn to scale and wherein through the views and figures like elements are referenced with identical reference numerals, there is illustrated a vehicle jack 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the vehicle jack 100 includes a frame 10 wherein the frame 10 is manufactured from a suitable rigid material such as but not limited to metal. The frame 10 includes a vertical support member 15 wherein the vertical support member 15 is elongated in manner and configured to be perpendicular and extend upward from a support surface on which the vehicle jack 100 is superposed. In a preferred embodiment the vertical support member 15 is tubular in shape being manufactured from round metal tubing. It should be understood within the scope of the present invention that the vertical support member 15 could be manufactured from alternate styles of metal tubing or other elements and as such have a different shape than the shape illustrated herein. Additionally, it should be understood within the scope of the present invention that the vertical support member 15 could be comprised of more than one element that are operably coupled. While no particular length of the vertical support member 15 is required, it is contemplated within the scope of the present invention that the vertical support member 15 is al least forty-eight inches in length. The vertical support member 15 includes first end 13 and second end 14. Secured to vertical support member 15 at the first end 13 thereof is base support member 20. Base support member 20 is secured to first end 13 utilizing suitable mechanical techniques. It is contemplated within the scope of the present invention that the base support member 20 could be removably secured to the vertical support member 15 for storage of the vehicle jack 100. The base support member 20 extends outward from the vertical support member 15 so as to engage a sufficient amount of area of a support surface on which the vehicle jack 100 is superposed. The base support member 20 provides lateral stability of the vehicle jack during use thereof. It is contemplated within the scope of the present invention that the base support member 20 could be provided in alternate sizes. Furthermore, while the base support member 20 is illustrated herein as being annular in shape it should be understood within the scope of the present invention that the base support member 20 could be provided in alternate shapes and achieve the desired functionality discussed herein.

Secured to the second end 14 of the vertical support member 15 is first pulley wheel 25. The first pulley wheel 25 is rotatably secured to the second end 14 of the vertical support member 15 utilizing suitable techniques. The first pulley wheel 25 functions as a rotational interface for the winch cable 95 wherein the winch cable 95 is operably coupled to a vehicle winch 99 secured to exemplary vehicle 98. As is known in the art, some vehicles can be equipped with electric winches that are most commonly mounted to the front bumper of an exemplary vehicle 98. The vehicle winch 99 is electrically coupled to a power system of the exemplary vehicle 98 in order to provide operation thereof. As will be further discussed herein, the vehicle attachment assemblies 50,60 are operably coupled to the vehicle winch 99 and traverse along the vertical support member 15.

Figure 3:
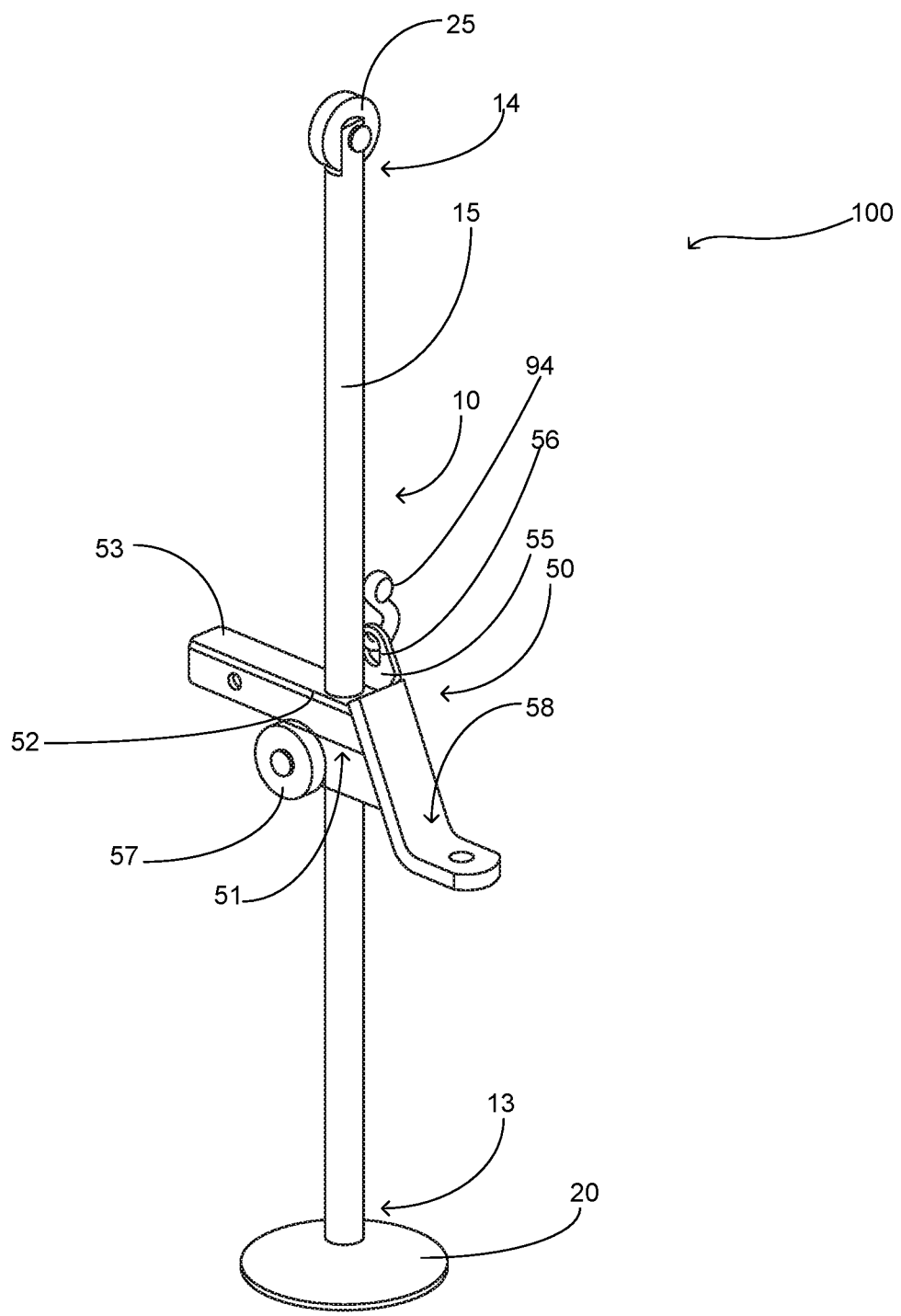
FIG. 3 is a perspective view of the present invention with the first embodiment of the vehicle attachment assembly.
Figure 4:
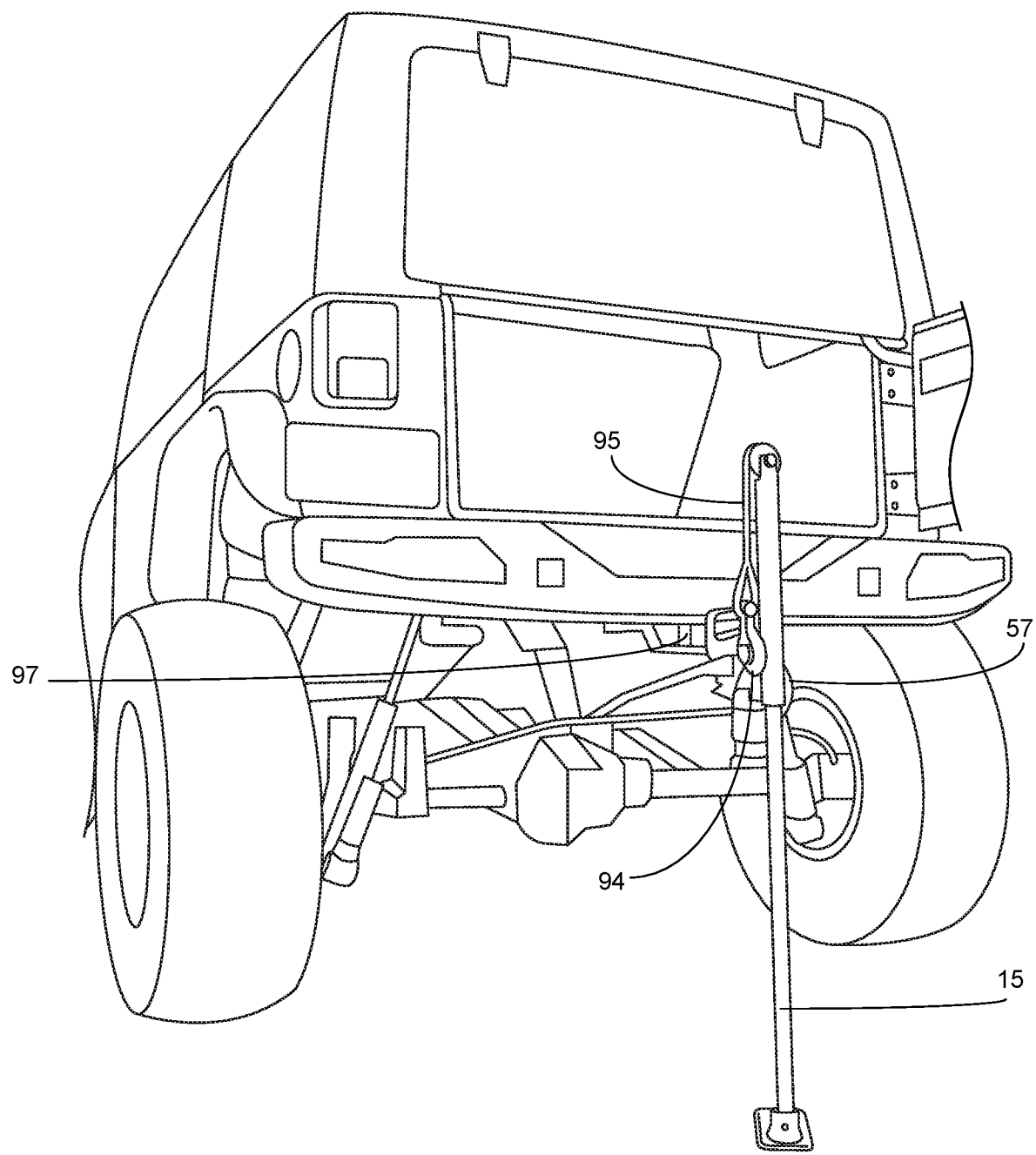
FIG. 4 is a perspective view of the present invention with the first embodiment of the vehicle attachment assembly operably coupled to an exemplary vehicle.

Illustrated in particular in FIG. 3 is a first embodiment of the vehicle attachment assembly 50. The vehicle attachment assembly 50 is manufactured from a suitable rigid material such as but not limited to metal. The vehicle attachment assembly 50 is configured to operably couple the exemplary vehicle 98 to the vehicle jack 100 specifically the vertical support member 15 thereof. The vehicle attachment assembly 50 includes a body member 51 wherein the body member 51 includes an aperture 52 configured to receive the vertical support member 15 therethrough. The body member 51 includes receiver engagement member 53 that is configured to engage a conventional frame hitch 97 mounted to a vehicle. As is known in the art, conventional frame hitches 97 are configured to receive a shank of a trailer mount therein. While a receiver engagement member 53 has been disclosed and discussed herein for a preferred embodiment, it is contemplated within the scope of the present invention that the body member 51 of the vehicle attachment assembly 50 could be configured to operably and/or mateably couple with any element secured to the rear of the vehicle 98. The receiver engagement member 53 is configured to be insertably mounted into the conventional frame hitch 97 and secured therein. The receiver engagement member 53 includes aperture 54 that is configured to receive therein a locking pin or similar element for securing of the vehicle attachment assembly 50 to a frame hitch 97.

The vehicle attachment assembly 50 further includes a hook interface 55. The hook interface 55 is secured to body 51 utilizing suitable techniques such as but not limited to welding. The hook interface 55 extends upward from the body 51 and includes hole 56 configured to operably couple with hook 94. Hook 94 is secured to winch cable 95, which is controlled by winch 99. Opposedly located on the body 51 from the hook interface 55 is the second pulley wheel 57. Second pulley wheel 57 is rotatably mounted to the body 51 utilizing suitable techniques. The second pulley wheel 57 is operably coupled with winch cable 95 during utilization of the vehicle jack 100 having employed the first embodiment of the vehicle attachment assembly 50.

The vehicle attachment assembly 50 further includes a trailer ball mounting member 58. The trailer ball mounting member 58 is integrally formed with the body 51 and is opposedly located from the receiver engagement member 53. The trailer ball mounting member 58 is configured to have a trailer ball mounted thereto so as to facilitate the operable coupling of a trailer to the vehicle attachment assembly 50. It should be understood within the scope of the present invention that the vehicle attachment assembly 50, specifically the first embodiment thereof, could remain operably coupled with the frame hitch 97 during normal operation of the vehicle 98 and not just when a need to lift the rear end of the vehicle 98 is required. As such the first embodiment of the vehicle attachment assembly 50 is provided with the trailer ball mounting member 58 in order to provide utilization of the frame hitch 97 for trailer towing. While a trailer ball mounting member 58 has been illustrated and discussed herein, it is contemplated within the scope of the present invention that the first embodiment of the vehicle attachment assembly 50 could be manufactured with a body 51 that does not include a trailer ball mounting member 58.

Referring now in particular to FIG. 1 herein, the vehicle jack 100 is illustrated therein with the second embodiment of the vehicle attachment assembly 60. The vehicle attachment assembly 60 includes body member 61 that is slidably coupled to the vertical support member 15. The body member 61 is manufactured from a durable rigid material such as but not limited to metal tubing. The body member 61 is configured to be secured to a front bumper 96 utilizing suitable durable techniques. The vehicle attachment assembly 60 further includes hook interface 62. The hook interface 62 is secured to the body member 61 utilizing suitable techniques such as but not limited to welding. The hook interface 62 extends upward from the body member 61 and is configured to engage hook 94. It should be understood within the scope of the present invention that the hook interface 62 could be manufactured in alternate sizes, shapes and configurations and still achieve the desired functionality discussed herein of operably coupling with hook 94.

Secured to the front of the body member 61 are roller mounts 65, 66 wherein the roller mounts 65, 66 have rollers 63,64 operably coupled therebetween. The rollers 63,64 are adjacent aperture 68 that is formed in the body member 61. The aperture 68 in body member 61 allows the winch cable 95 to be routed in a desired path for operation of the vehicle jack 100 when the need to lift the front end of the vehicle 98 is desired. The rollers 63,64 facilitate movement of the winch cable 95 through the aperture 68 and inhibit any damage that could occur thereto. It should be understood within the scope of the present invention that only one roller could be provided in order to achieve the discussed functionality.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle jack that is configured to be operably coupled to a front bumper of a vehicle wherein the vehicle includes a winch and wherein the vehicle jack is operably coupled to the winch and comprises:
    a frame, said frame having a vertical support member, said vertical support member having a first end and a second end, said vertical support member configured to be placed adjacent the front end of the vehicle, said frame further including a base member, said base member being secured to said first end of said vertical support member, said base member being perpendicular to said vertical support member so as to provide lateral stability of the vertical support member;
    a vehicle attachment assembly, said vehicle attachment assembly being slidably coupled to said vertical support member, said vehicle attachment assembly having a body member, said body member being configured to be secured to the front bumper of the vehicle, wherein said body member is manufactured from metal hollow tubing, said body member further including an aperture journaled therethrough, wherein the body member further includes roller mounts, said roller mounts being secured to a front surface of the body member on opposing sides of the aperture journaled through the body member; and
    wherein the vehicle jack is operable coupled to the winch wherein the winch is utilized to move the vehicle attachment assembly in an upwards direction along the vertical support member so as to facilitate the lifting of the front end of the vehicle.

2. The vehicle jack as recited in claim 1, and further including a pair of rollers, said pair of rollers being mounted between the roller mounts, said pair of rollers positioned to border the aperture in said body member.

3. The vehicle jack as recited in claim 2, and further including a hook interface, said hook interface being secured to said body member, said hook interface extending upward from said body member, said hook interface configured to engage a hook secured to a winch cable operably coupled to the winch.

4. The vehicle jack as recited in claim 3, and further including a first pulley wheel, said first pulley wheel being rotatably mounted to said vertical support member proximate said second end thereof.

5. The vehicle jack as recited in claim 4, wherein said hook interface further includes an aperture, said aperture operable to have a portion of the hook journaled therethrough.

6. The vehicle jack as recited in claim 5, wherein said base member is annular in shape.

7. The vehicle jack as recited in claim 6, wherein said vertical support member of said frame is at least forty-eight inches in length.

\* \* \* \* \*